(12) United States Patent
Mizushima

(10) Patent No.: US 8,638,541 B2
(45) Date of Patent: Jan. 28, 2014

(54) INPUT DEVICE

(75) Inventor: Masanori Mizushima, Takaoka (JP)

(73) Assignee: Oga, Inc., Takaoka-Shi (JP)

(*) Notice: Subject to any disclaimer, the term of this patent is extended or adjusted under 35 U.S.C. 154(b) by 144 days.

(21) Appl. No.: 13/410,717

(22) Filed: Mar. 2, 2012

(65) Prior Publication Data

US 2012/0160657 A1   Jun. 28, 2012

Related U.S. Application Data

(63) Continuation of application No. PCT/JP2010/052167, filed on Feb. 15, 2010.

(30) Foreign Application Priority Data

Feb. 3, 2010   (JP) .................................. 2010-022581

(51) Int. Cl.
*H01G 7/00* (2006.01)

(52) U.S. Cl.
USPC ........ 361/283.1; 361/273; 361/278; 361/279; 361/283.2; 361/290

(58) Field of Classification Search
USPC ........... 361/283.1, 272–273, 278–279, 283.2, 361/283.3, 286, 287, 290–292
See application file for complete search history.

(56) References Cited

U.S. PATENT DOCUMENTS

| | | | | |
|---|---|---|---|---|
| 5,179,460 A | * | 1/1993 | Hinata et al. | 349/149 |
| 6,145,384 A | * | 11/2000 | Ikeda et al. | 73/780 |
| 6,356,257 B1 | * | 3/2002 | Kaneo | 345/161 |
| 6,813,135 B2 | * | 11/2004 | Nakamura et al. | 361/277 |
| 6,940,495 B2 | * | 9/2005 | Morimoto et al. | 345/174 |
| 7,592,901 B2 | * | 9/2009 | Furusho | 340/407.1 |
| 8,519,281 B2 | * | 8/2013 | Mizushima | 178/18.06 |

FOREIGN PATENT DOCUMENTS

| | | |
|---|---|---|
| JP | 2579638 B2 | 2/1997 |
| JP | 11-132872 A1 | 5/1999 |
| JP | 2001-091382 A1 | 4/2001 |
| JP | 2001-330527 A1 | 11/2001 |
| JP | 2008-300247 AI | 12/2008 |

* cited by examiner

*Primary Examiner* — Nguyen T Ha
(74) *Attorney, Agent, or Firm* — Burr & Brown, PLLC

(57) ABSTRACT

An input device includes a movable electrode and a capacitance detection electrode provided on the upper and lower sides of the resin film substrate, respectively. The movable electrode includes a moving section, and an immobile section. The moving section includes a protrusion. The end of the protrusion comes in contact with the upper side of the resin film substrate in an initial state, or is bonded to the upper side of the resin film substrate. The protrusion has a curved shape so that the side surface of the protrusion is depressed relative to a straight line that connects the end and the base of the protrusion having an approximately trapezoidal cross-sectional shape, or at least one step is formed on the side surface of the protrusion, and the width of the protrusion increases stepwise from the end to the base of the protrusion.

19 Claims, 14 Drawing Sheets

A-A CROSS SECTION

INPUT DEVICE

CROSS REFERENCE TO RELATED APPLICATION

This application is a continuation of International Patent Application No. PCT/JP2010/052167, having an international filing date of Feb. 15, 2010, which designated the United States, the entirety of which is incorporated herein by reference. Japanese Patent Application No. 2010-022581 filed on Feb. 3, 2010 is also incorporated herein by reference in its entirety.

BACKGROUND

The present invention relates to an input device that detects capacitance that changes depending on the pressing state of a movable electrode, and outputs an input signal.

A capacitance force sensor that detects the amount of change in capacitance that differs depending on the pressing force and the pressing direction of an operation section, and outputs at least one of an X-axis input signal, a Y-axis input signal, and a Z-axis input signal, has been known as an input device used for electronic instruments and the like.

For example, JP-A-11-132872 discloses a capacitance input detection device in which electrodes $Dx^+$, $Dx^-$, $Dy^+$, $Dy^-$, and the like are disposed on a substrate, the electrodes being coated with a resist film, and a dome-shaped metal plate and an operation button being disposed over the electrodes. When employing such a structure, however, the number of parts and the production cost increase. Moreover, since the size of the entire device necessarily increases, it is difficult to reduce the thickness and the size of the device.

Since it is necessary to provide a housing that holds the dome-shaped metal plate and the operation button, it is difficult to secure the input device on an irregular surface of an electronic instrument due to poor flexibility.

Since such an input device is configured so that a change in capacitance is nonlinear with respect to the force applied to the operation button, a comfortable operation feel cannot be obtained when the output is not adjusted using software or the like. This may make it necessary to use an expensive CPU depending on the adjustment load, so that an increase in cost may occur.

SUMMARY

According to one aspect of the invention, there is provided an input device comprising:

a resin film substrate, a plurality of lead electrodes being formed on the resin film substrate;

a movable electrode that is provided on an upper side of the resin film substrate, and is formed of a conductive material; and at least one capacitance detection electrode that is provided on a lower side of the resin film substrate, the movable electrode including at least one moving section that moves when pressed, and at least one immobile section that is bonded to the upper side of the resin film substrate, the at least one immobile section being electrically connected to one lead electrode among the plurality of lead electrodes, the at least one moving section including a protrusion that protrudes toward the upper side of the resin film substrate, an end of the protrusion coming in contact with the upper side of the resin film substrate in an initial state, or being bonded to the upper side of the resin film substrate, the at least one capacitance detection electrode being disposed opposite to the at least one moving section, and being electrically connected to at least one other lead electrode among the plurality of lead electrodes, and the protrusion having a curved shape so that a side surface of the protrusion is depressed relative to a straight line that connects the end and a base of the protrusion having an approximately trapezoidal cross-sectional shape, or at least one step being formed on the side surface of the protrusion so that a width of the protrusion increases stepwise from the end to the base of the protrusion.

According to another aspect of the invention, there is provided an input device comprising:

a resin film substrate, a plurality of lead electrodes being formed on the resin film substrate;

a movable electrode that is provided on an upper side of the resin film substrate, and is formed of a conductive material; and at least one capacitance detection electrode that is provided on a lower side of the resin film substrate, the movable electrode including at least one moving section that moves when pressed, and at least one immobile section that is bonded to the upper side of the resin film substrate, the at least one immobile section being electrically connected to one lead electrode among the plurality of lead electrodes, the at least one moving section including a plurality of protrusions that protrude toward the upper side of the resin film substrate, the at least one capacitance detection electrode being disposed opposite to the at least one moving section, and being electrically connected to at least one other lead electrode among the plurality of lead electrodes, the plurality of protrusions being formed concentrically, an end of an innermost protrusion among the plurality of protrusions coming in contact with the upper side of the resin film substrate in an initial state, or being bonded to the upper side of the resin film substrate, and the plurality of protrusions sequentially decreasing in height from the innermost protrusion to an outermost protrusion among the plurality of protrusions.

According to another aspect of the invention, there is provided an input device comprising:

a resin film substrate, a plurality of lead electrodes being formed on the resin film substrate;

a movable electrode that is provided on an upper side of the resin film substrate, and is formed of a conductive material; and at least one capacitance detection electrode that is provided on a lower side of the resin film substrate, the movable electrode including at least one moving section that moves when pressed, and at least one immobile section that is bonded to the upper side of the resin film substrate, the at least one immobile section being electrically connected to one lead electrode among the plurality of lead electrodes, the at least one moving section including a protrusion that protrudes toward the upper side of the resin film substrate, an end of the protrusion coming in contact with the upper side of the resin film substrate in an initial state, or being bonded to the upper side of the resin film substrate, the at least one capacitance detection electrode being disposed opposite to the at least one moving section, and being electrically connected to at least one other lead electrode among the plurality of lead electrodes, the movable electrode including a center immobile section and a peripheral immobile section that are provided concentrically, the protrusion of the at least one moving section being formed between the center immobile section and the peripheral immobile section so as to be concentric with the center immobile section and the peripheral immobile section, and a tilt angle of a first side surface of the protrusion that is formed from the end of the protrusion toward the center immobile section differing from a tilt angle of a second side surface of the protrusion that is formed from the end of the protrusion toward the peripheral immobile section.

DESCRIPTION OF EXEMPLARY EMBODIMENTS

Figure 1A:
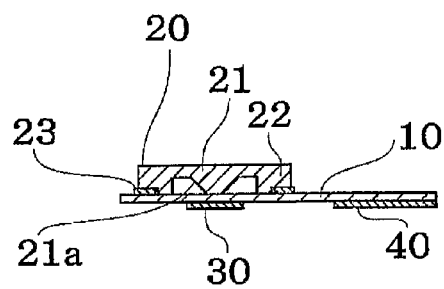
FIG. 1A is a cross-sectional view of a single-axis detection input device in which a protrusion of a moving section of a movable electrode has an approximately trapezoidal cross-sectional shape.

Several embodiments of the invention may provide an input device that can be effectively reduced in thickness, shows a stable change in capacitance even when a substrate is bent, and allows an easy adjustment of capacitance change characteristics with respect to the force applied to a movable electrode.

An input device according to one embodiment of the invention includes:

a resin film substrate, a plurality of lead electrodes being formed on the resin film substrate;

a movable electrode that is provided on an upper side of the resin film substrate, and is formed of a conductive material; and at least one capacitance detection electrode that is provided on a lower side of the resin film substrate, the movable electrode including at least one moving section that moves when pressed, and at least one immobile section that is bonded to the upper side of the resin film substrate, the at least one immobile section being electrically connected to one lead electrode among the plurality of lead electrodes, the at least one moving section including a protrusion that protrudes toward the upper side of the resin film substrate, an end of the protrusion coming in contact with the upper side of the resin film substrate in an initial state, or being bonded to the upper side of the resin film substrate, and the at least one capacitance detection electrode being disposed opposite to the at least one moving section, and being electrically connected to at least one other lead electrode among the plurality of lead electrodes.

Note that the term "upper side" of the resin film substrate refers to the side of the resin film substrate on which the movable electrode is provided, and the term "lower side" of the resin film substrate refers to the side of the resin film substrate on which the capacitance detection electrode is provided.

The input device is configured so that a change in capacitance between the movable electrode formed of a conductive material and the capacitance detection electrode due to the pressing force and the pressing direction when the movable electrode has been pressed (deformed) is detected as an analog signal or a digital (device) signal. The resin film substrate functions as an insulating layer between the movable electrode and the capacitance detection electrode.

It is preferable that the resin film substrate have a small thickness from the viewpoint of an improvement in the detection sensitivity of the input device and the bending (flexural) properties of the substrate. The thickness of the resin film substrate is preferably 25 to 100 μm.

It is preferable that the resin film substrate be formed of a polyimide film, a polyethylene terephthalate film, or the like due to high strength.

The capacitance detection electrode is formed on the lower side of the resin film substrate as a fixed electrode so that the capacitance detection electrode is opposite to the moving section of the movable electrode.

The overlapping area of the movable electrode and the capacitance detection electrode changes when the movable electrode has been pressed, so that a change in capacitance occurs. The change in capacitance can be output as an analog signal or a digital signal using a signal processing circuit that is connected to the input device.

When the capacitance detection electrode is divided in the circumferential direction around the center of the movable electrode, the amount of change in capacitance in the X-axis direction and the amount of change in capacitance in the Y-axis direction can be subjected to vector synthesis, and can be input/output as a direction detection signal.

The moving section of the movable electrode includes the protrusion that protrudes toward the upper side of the resin film substrate, and the end of the protrusion comes in contact with, or is bonded to, the upper side of the resin film substrate. This configuration is employed for the following reasons.

Figure 14A:
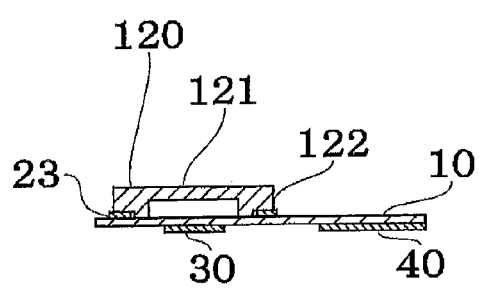
FIGS. 14A to 14E are views illustrating an example in which a moving section of a movable electrode is flat.
Figure 14B:
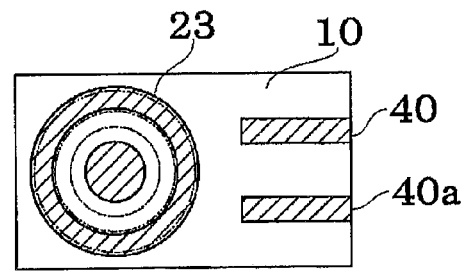
Figure 14C:
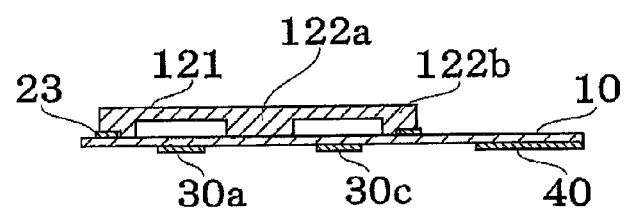
Figure 14D:
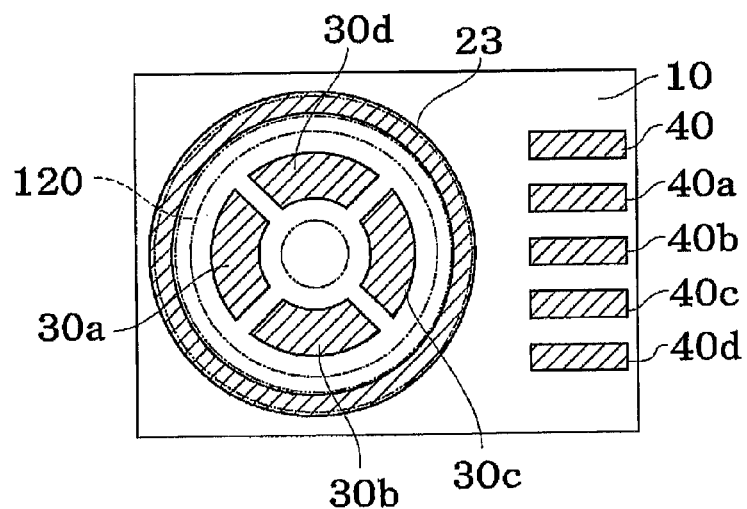

FIGS. 14A and 14B illustrate a single-axis input device, and FIGS. 14C and 14D illustrate a two-axis (multi-axis) input device. As shown in FIGS. 14A to 14D that illustrate a comparative example, a movable electrode 120 is formed on the upper side of a resin film substrate 10 using a conductive rubber. The movable electrode 120 includes a flat moving section 121, and an immobile section 122 that is provided around the moving section 121. A lead electrode 40 that is electrically connected to the immobile section 122 via a connection section 123, and a capacitance detection electrode 30 that is provided on the lower side of the resin film substrate 10 and is opposite to the moving section 121, are formed on the resin film substrate 10 by screen printing or the like. The capacitance detection electrode 30 (30a to 30d) is connected to a lead electrode 40a (40a to 40d). A voltage that periodically changes is applied between the movable electrode 120 and the capacitance detection electrode 30.

When the moving section 121 has been pressed, the capacitance between the movable electrode 120 and the capacitance detection electrode 30 changes depending on the pressing force, so that the voltage changes relative to a no-load state.

Figure 14E:
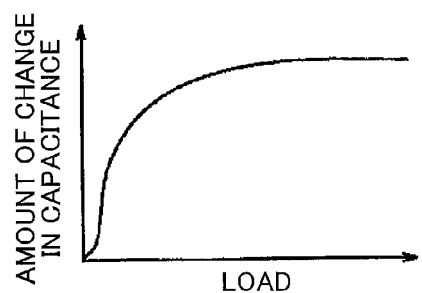

FIG. 14E is a graph schematically showing a change in capacitance (voltage) with respect to the pressing load.

As shown in FIG. 14E, a change in capacitance is small when the pressing load is low since the lower side of the moving section 121 is flat, and a space is formed between the moving section 121 and the upper side of the resin film substrate 10 in an initial no-load state. After the lower side of the moving section 121 has come in contact with the upper side of the resin film substrate 10, the capacitance changes rapidly with respect to a change in pressing load, and saturation occurs quickly.

When securing the input device on a curved surface (e.g., convex or concave surface) of an electronic instrument or the like, the resin film substrate 10 is bent depending on the shape of the curved surface, so that the space formed between the moving section 121 and the resin film substrate 10 changes. As a result, the output signal may change (vary) to a large extent.

The above problems may be prevented by forming a protrusion 121a on the lower side of the moving section 121 so that the end of the protrusion 121a comes in contact with the upper side of the resin film substrate 10 (see FIGS. 13A to 13E).

Figure 13A:
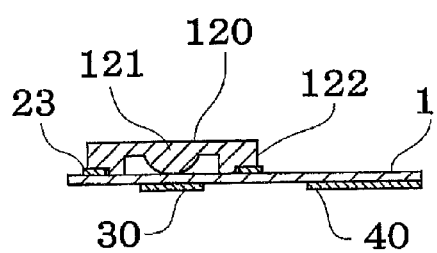
FIGS. 13A to 13F are views illustrating an example in which a protrusion has a hemispherical shape.
Figure 13B:
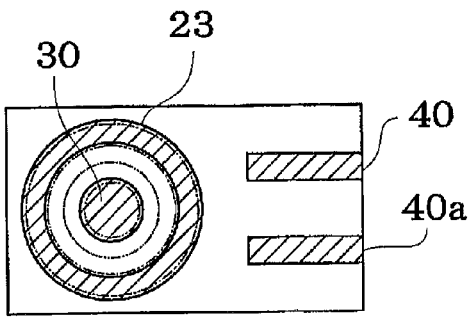
Figure 13C:
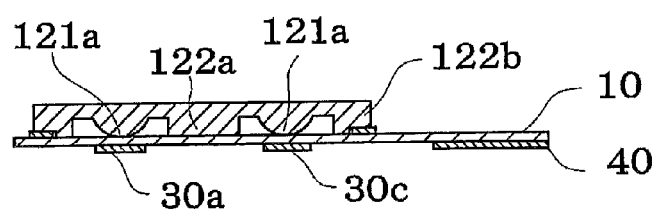
Figure 13D:
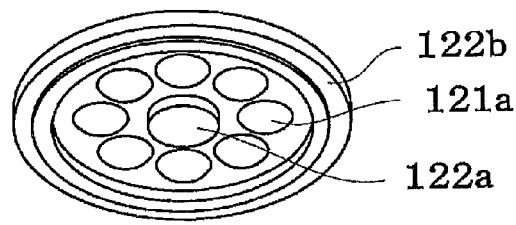
Figure 13E:
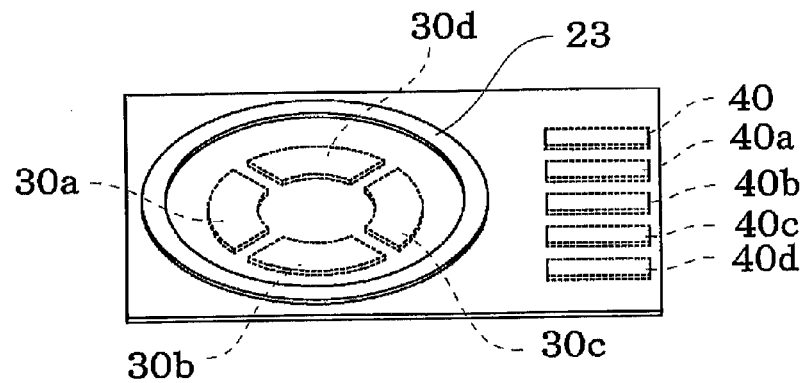
Figure 13F:
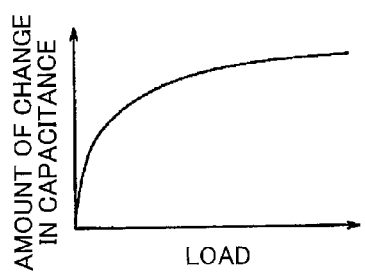

This makes it possible to reduce a change (variation) in output signal due to bending of the resin film substrate 10. However, when the protrusion 121a has an outwardly curved shape (see FIGS. 13A and 13C), the lower side of the moving section 121 comes in contact with the resin film substrate 10 immediately after the movable electrode 120 has been pressed. As a result, the overlapping area of the fixed electrode (capacitance detection electrode 30) and the movable electrode 20 changes to a large extent, so that a nonlinear curve shown in FIG. 13F is obtained.

Figure 1B:
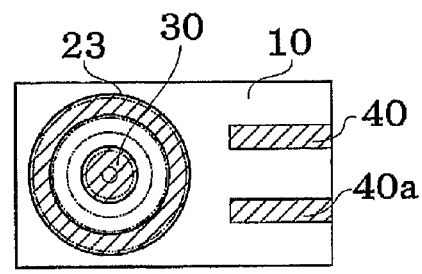
FIG. 1B is a plan view of a single-axis detection input device.
Figure 1C:
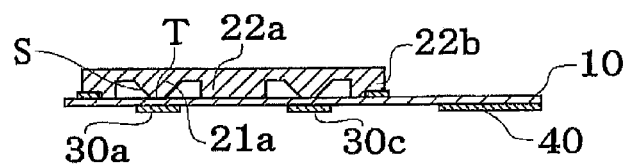
FIG. 1C is cross-sectional view of a two-axis (multi-axis) input device.
Figure 1D:
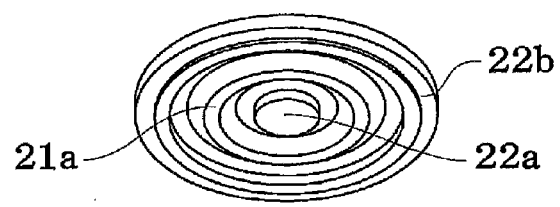
FIG. 1D is an external perspective view of a movable electrode (viewed from the lower side)
Figure 1E:
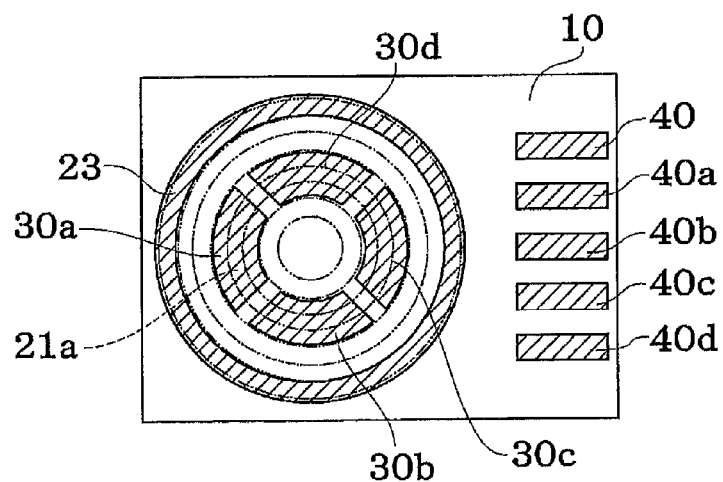
FIG. 1E is a plan view of a two-axis (multi-axis) input device.
Figure 1F:
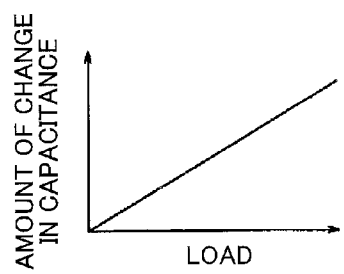
FIG. 1F is a characteristic diagram showing the relationship between load and the amount of change in capacitance.

It is desirable that a change in capacitance be linear (see FIG. 1F). It is more desirable that the capacitance initially change to only a small extent, and then change linearly (see FIG. 2E).

As a first measure to obtain such capacitance change characteristics, the resin film substrate is used as an insulating layer, and the capacitance detection electrode is provided on the lower side of the resin film substrate so that the capacitance detection electrode is opposite to the moving section of the movable electrode that is provided on the upper side of the resin film substrate. The capacitance detection electrode is also opposite to the end of the protrusion that protrudes from the moving section. The protrusion is formed so that the end of the protrusion comes in contact with the upper side of the resin film substrate, or the end of the protrusion is bonded to the upper side of the resin film substrate. According to this configuration, a capacitance larger than that obtained using the parallel electrode structure shown in FIGS. 14A and 14C can be obtained in an initial state in which the movable electrode is not pressed, and a subsequent rapid change in capacitance can be suppressed.

As a second measure to obtain the above capacitance change characteristics, the deformation (overlapping area) pattern of the protrusion when the movable electrode has been pressed is improved as described below.

Note that the following methods may be used either alone or in combination.

Specifically, the protrusion may have a curved shape so that the side surface of the protrusion is depressed relative to a straight line that connects the end and the base of the protrusion having an approximately trapezoidal cross-sectional shape (see FIGS. 2A to 2E).

Alternatively, at least one step may be formed on the side surface of the protrusion having an approximately trapezoidal cross-sectional shape so that the width of the protrusion increases stepwise from the end to the base of the protrusion (see FIGS. 3A to 3E).

Alternatively, a plurality of protrusions may be formed concentrically. The end of the innermost protrusion among the plurality of protrusions may come in contact with the upper side of the resin film substrate in an initial state, or may be bonded to the upper side of the resin film substrate, and the plurality of protrusions sequentially decrease in height from the innermost protrusion to the outermost protrusion (see FIG. 15A).

Alternatively, the protrusion may be formed radially from the center to the outer circumference when viewed vertically (see FIGS. 4A to 4D).

Alternatively, the movable electrode may include a center immobile section and a peripheral immobile section that are provided concentrically. The protrusion may be formed between the center immobile section and the peripheral immobile section so as to be concentric with the center immobile section and the peripheral immobile section. The tilt angle of a first side surface of the protrusion that is formed from the end of the protrusion toward the center immobile section may differ from the tilt angle of a second side surface of the protrusion that is formed from the end of the protrusion toward the peripheral immobile section (see FIGS. 6A to 6D).

Note that the capacitance detection electrode need not be provided opposite to the end of the protrusion when it is desired to improve the overlapping area by utilizing the deformation pattern of the protrusion.

In this case, it is possible to relatively reduce the initial capacitance.

The protrusion may have a projection that does not affect a change in capacitance and is positioned between the protrusion and the capacitance detection electrode. The end of the projection may be caused to come in contact with, or may be bonded to, the upper side of the resin film substrate. This makes it possible to relatively reduce the initial capacitance.

Figure 10:
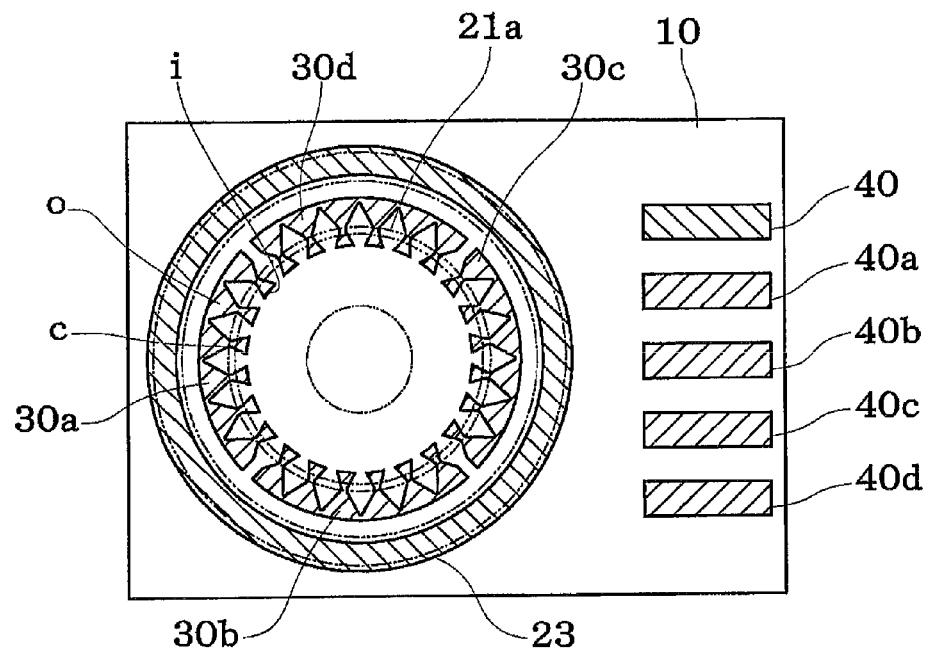
FIG. 10 is a view illustrating an example in which the area of a capacitance detection electrode increases as the distance from a position opposite to a protrusion increases.
Figure 11:
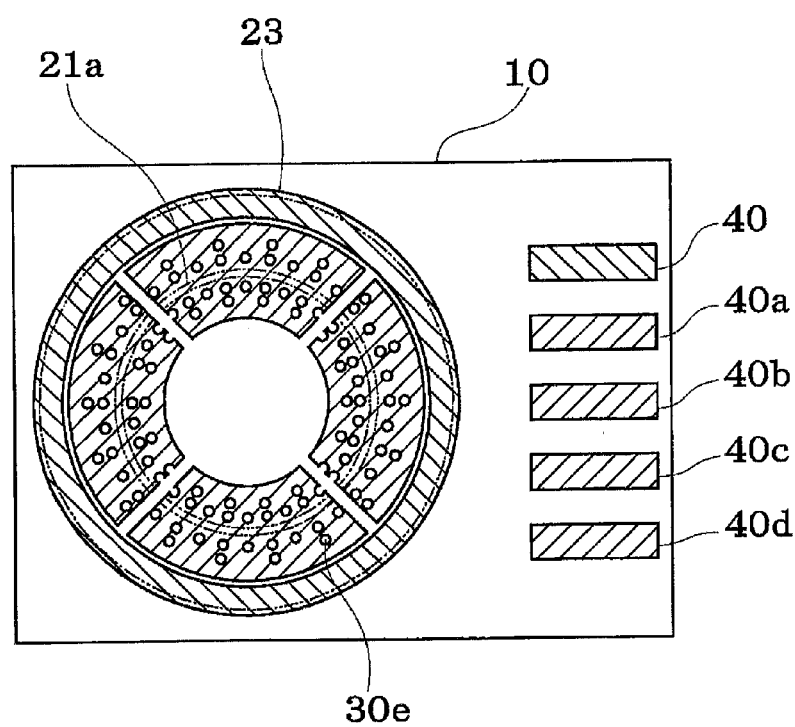
FIG. 11 is a view illustrating another example in which the area of a capacitance detection electrode increases as the distance from a position opposite to a protrusion increases.

The capacitance detection electrode may be formed in such a number or shape that an area opposite to the moving section increases as the distance from the end of the protrusion of the movable electrode increases (see FIGS. 10 and 11).

The resin film substrate is easily bent, and a change (variation) in output signal is reduced when using the following methods.

Specifically, the resin film substrate may have a connection section that connects the immobile section of the movable electrode and the lead electrode, and the immobile section of the movable electrode may have a groove that is formed around the connection section (see FIGS. 8A to 8D).

Figure 9A:
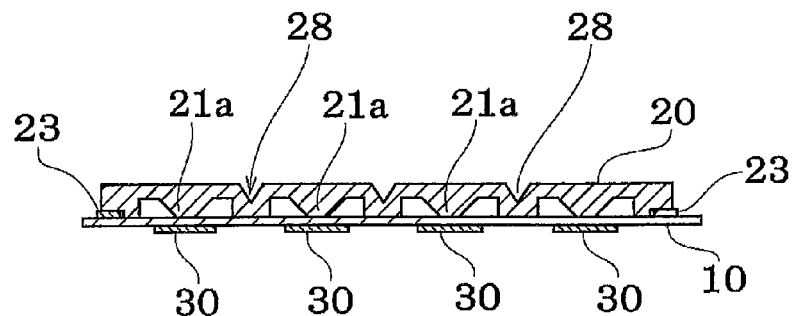
FIGS. 9A to 9C are views illustrating an input device in which sensor sections are disposed in a matrix, wherein a hollow section is formed in an immobile section of a movable electrode so that the input device is easily bent.
Figure 9B:
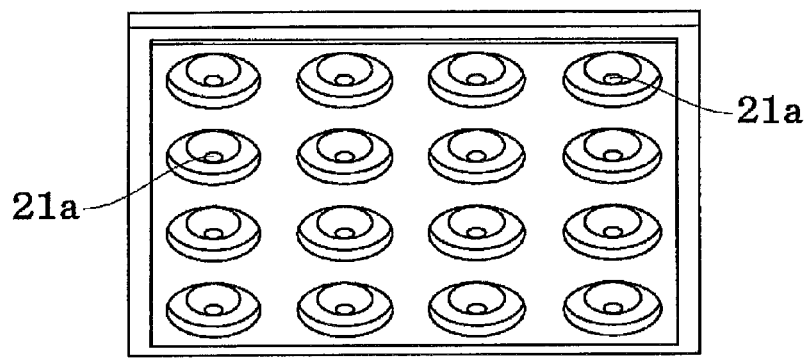
Figure 9C:
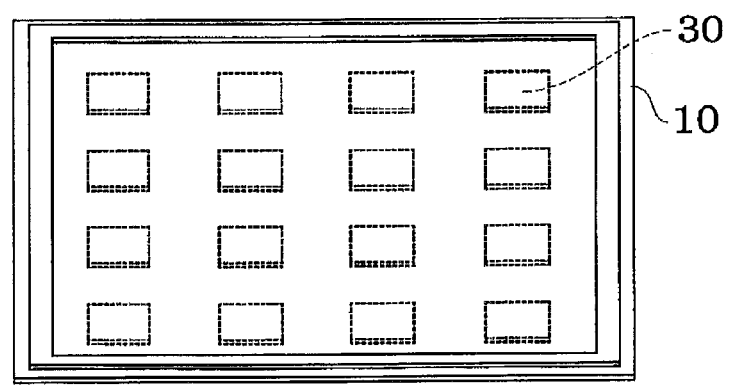

Alternatively, the movable electrode may include a plurality of immobile sections and a plurality of moving sections, and the plurality of immobile sections may include a hollow section that enables the resin film substrate to be easily bent (see FIGS. 9A to 9C).

Alternatively, the immobile section that is bonded to the resin film substrate may include a depression or a groove that receives an adhesive (see FIGS. 5A to 5D).

An electrode pattern may not be formed on the lower side of the resin film substrate in an area opposite to an area of the immobile section of the movable electrode that is bonded to the upper side of the resin film substrate. According to this configuration, when bonding the movable electrode to the upper side of the resin film substrate using a UV-curable adhesive, UV rays can be applied to the UV-curable adhesive from the lower side of the transparent resin film substrate without being blocked by an electrode pattern.

The input device can be effectively reduced in thickness and size by employing a structure in which the movable electrode formed of a conductive material is secured on the upper side of the resin film substrate, and the capacitance detection electrode (i.e., fixed electrode) is formed on the lower side of the resin film substrate using a silver paste or the like. A capacitance larger than that obtained using a parallel electrode structure can be obtained in an initial state by forming the protrusion that protrudes toward the upper side of the resin film substrate as the moving section of the movable electrode so that the end of the protrusion comes in contact with the upper side of the resin film substrate in a no-load state, or is bonded to the upper side of the resin film substrate. It is also possible to suppress a rapid change in output signal immediately after an operation button has been pressed, or obtain (almost) linear capacitance change characteristics, by modifying the cross-sectional shape of the protrusion or the arrangement of the capacitance detection electrode.

Since the end of the protrusion comes in contact with the upper side of the resin film substrate in a no-load state, or is bonded to the upper side of the resin film substrate, the protrusion serves as a support section that supports the movable electrode even if the input device is bent to some extent, so that a change (variation) in input/output signal characteristics is reduced.

Examples of the structure of an input device according to several exemplary embodiments the invention are described below with reference to the drawings. The input device is a force sensor that includes a conductive movable electrode that is provided on the upper side of a resin film substrate, and a capacitance detection electrode (i.e., fixed electrode) that is provided on the lower side of the resin film substrate, wherein a moving section of the movable electrode includes a protrusion, and the end of the protrusion comes in contact with, or is bonded to, the upper side of the resin film substrate.

The input device may be used for arbitrary applications (e.g., analog input/output signal, digital (device) signal, or matrix signal may be used).

FIG. 1A is a cross-sectional view of a single-axis detection input device, and FIG. 1B is a plan view of the input device. In FIGS. 1A and 1B, electrodes provided on a resin film substrate are indicated by diagonal lines.

As shown in FIG. 1A, the input device includes a resin film substrate 10, and a movable electrode 20 that is provided on the upper side of the resin film substrate 10. The input device also includes a capacitance detection electrode 30 that is provided on the lower side of the resin film substrate 10. The movable electrode 20 is formed of a conductive material (e.g., conductive rubber), and includes a moving section 21 that moves when pressed, and an immobile section 22 that is secured on the upper side of the resin film substrate 10.

The immobile section 22 is electrically connected to a connection section 23 that is formed on the upper side of the resin film substrate 10 using a silver paste or the like. The connection section 23 is electrically connected to a lead electrode 40 via a patterned wire or the like.

The capacitance detection electrode 30 is electrically connected to a lead electrode 40a via a patterned wire or the like.

FIG. 1C is a cross-sectional view of a two-axis (e.g., X-axis and Y-axis) (multi-axis) input device, FIG. 1D is an external perspective view of a movable electrode 20 included in the input device shown in FIG. 1C (viewed from the lower side), and FIG. 1E is a plan view of the input device shown in FIG. 1C. In FIG. 1E, the movable electrode 20 is indicated by dash-dot-dot lines.

The movable electrode 20 included in the two-axis (multi-axis) input device includes a center immobile section 22a and a peripheral immobile section 22b.

FIGS. 1A to 1E illustrate an example in which the moving section 21 of the movable electrode 20 includes a protrusion 21a having an approximately trapezoidal cross-sectional shape.

As shown in FIG. 1C, an end T of the protrusion 21a comes in contact with the upper side of the resin film substrate 10 in a no-load initial state, or is bonded to the upper side of the resin film substrate 10 using an adhesive.

In the single-axis detection input device shown in FIG. 1A, the protrusion 21a has a circular truncated conical external shape.

In the multi-axis detection input device shown in FIG. 1C, the protrusion 21a is in the shape of a ring (see FIG. 1D). Note that a plurality of circular truncated conical protrusions 21a may be disposed concentrically.

The capacitance detection electrode 30 shown in FIG. 1E includes capacitance detection electrodes 30a and 30c for detecting the X-axis pressing direction, and capacitance detection electrodes 30b and 30d for detecting the Y-axis pressing direction. Specifically, the capacitance detection electrode 30 is divided into four sections (electrodes) in the circumferential direction. The pressing direction resultant vector accuracy and the detection sensitivity are improved by increasing the number of sections (electrodes) into which the capacitance detection electrode 30 is divided. The capacitance detection electrodes 30a to 30d are electrically connected to lead electrodes 40a to 40d via a patterned wire or the like.

Figure 15A:
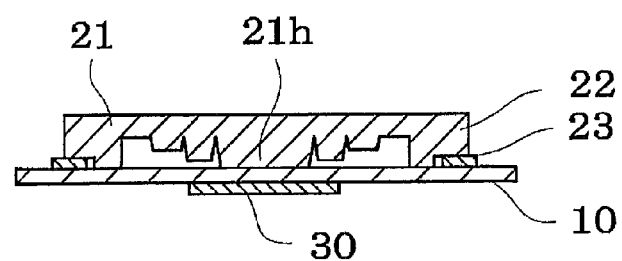
FIG. 15A is a view illustrating an example in which a plurality of protrusions are formed concentrically.
Figure 15B:
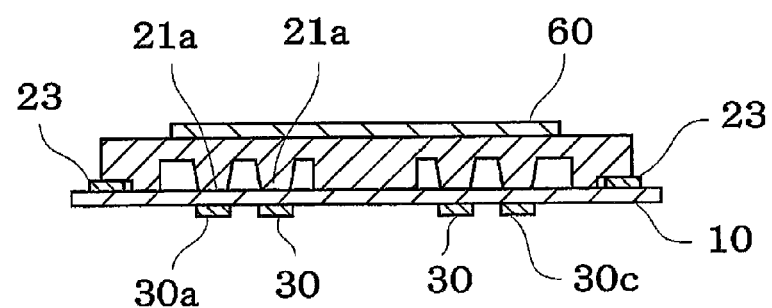
FIG. 15B is a view illustrating an example in which the pressing force and the pressing direction are detected at the same time.

As shown in FIG. 15B, a ring-shaped capacitance detection electrode 30 for detecting the pressing force and capacitance detection electrodes (30a to 30d) for detecting the X-axis pressing direction and the Y-axis pressing direction may be provided in combination, for example. Note that FIG. 15B illustrates only the capacitance detection electrodes 30a and 30c for detecting the X-axis pressing direction, and the capacitance detection electrodes 30b and 30d for detecting the Y-axis pressing direction are omitted. As shown in FIG. 15B, an operation button 60 may be attached (bonded) to the movable electrode 20.

When the protrusion 21a has such a shape, linear capacitance change characteristics similar to those shown in FIG. 1F can be obtained by appropriately selecting the tilt angle of a side surface S of the protrusion 21a taking account of the elastic properties of the material that forms the movable electrode 20.

In FIGS. 1A to 1E, the capacitance detection electrode 30 is provided on the lower side of the resin film substrate 10 so that the capacitance detection electrode 30 is opposite to the end of the protrusion 21a that comes in contact with, or is bonded to, the upper side of the resin film substrate 10. In this case, a capacitance larger than that obtained when using a parallel electrode structure (see FIGS. 14A and 14C) can be obtained in an initial state.

This makes it possible to reduce a change in capacitance during an initial pressing operation. When it is desired to increase the range of the amount of change in capacitance, the capacitance detection electrode 30 may be partially not provided at a position opposite to the end of the protrusion 21a, and a change in the overlapping area with the capacitance detection electrode 30 may be made linear by utilizing only the cross-sectional shape of the protrusion 21a.

Various embodiments of the input device are described below. In the following description, the same sections as those of the input devices shown in FIGS. 1A to 1E are indicated by the same reference numerals (symbols). The following description mainly focuses on the differences from the input devices shown in FIGS. 1A to 1E.

FIGS. 2A to 2E illustrate an example in which a protrusion 21b has a curved shape so that the side surface S of the protrusion 21b is depressed relative to a straight line that connects the end and the base of the protrusion 21b having an approximately trapezoidal cross-sectional shape.

Figure 2A:
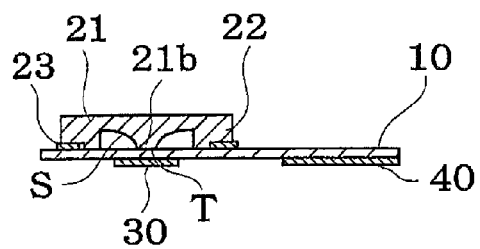
FIGS. 2A to 2E are views illustrating an example in which the side surface of a protrusion is depressed (i.e., has a curved shape).
Figure 2B:
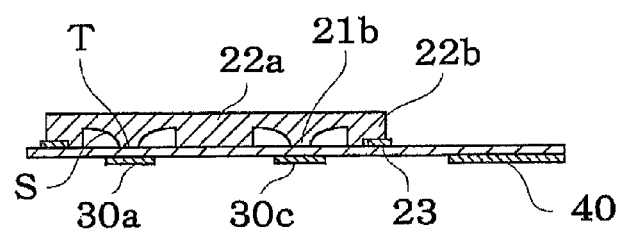
Figure 2C:
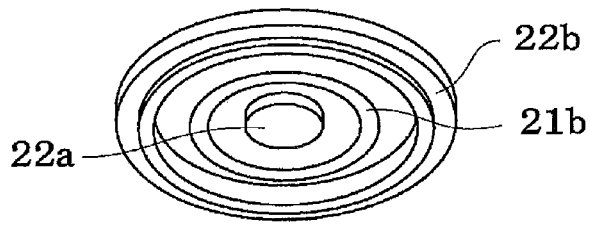
Figure 2D:
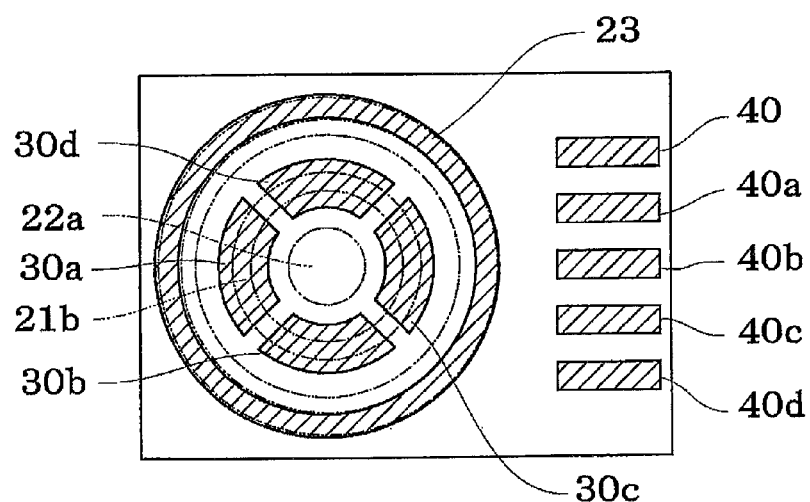
Figure 2E:
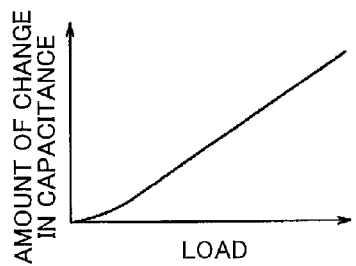

This makes it possible to easily obtain capacitance change characteristics that show a small initial change, and then become linear (see FIG. 2E).

In FIGS. 2A and 2C, the end of the protrusion 21b comes in contact with, or is bonded to, the upper side of the resin film substrate 10 in the same manner as in FIGS. 1A and 1C. Note that the end of the protrusion 21b may have a projection that does not affect a change in capacitance, and the end of the projection may come in contact with, or may be bonded to, the upper side of the resin film substrate 10. This makes it possible to relatively reduce the initial capacitance.

FIGS. 3A to 3E illustrate an example in which at least one step is formed on the side surface S of a protrusion 21c having an approximately trapezoidal cross-sectional shape so that the width of the protrusion 21c increases stepwise from the end to the base of the protrusion 21c.

The side surface S of the protrusion 21c may be formed in the shape of stairs, or may be formed by connecting curved steps.

As shown in FIG. 15A, a plurality of protrusions may be formed concentrically. The end of the innermost protrusion 21h among the plurality of protrusions may come in contact with the upper side of the resin film substrate 10 in an initial state, or may be bonded to the upper side of the resin film substrate 10, and the plurality of protrusions sequentially decrease in height from the innermost protrusion to the outermost protrusion.

Figure 3A:
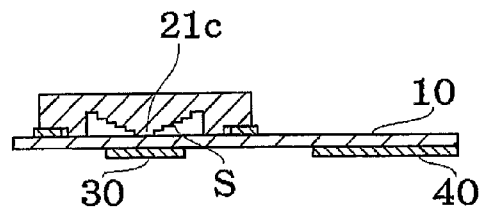
FIGS. 3A to 3E are views illustrating an example in which a step is formed on the side surface of a protrusion.
Figure 3B:
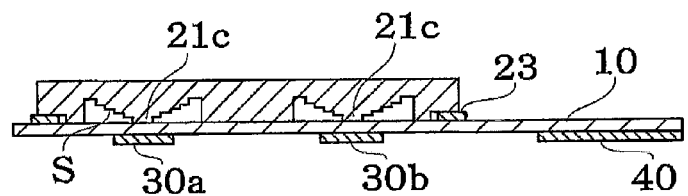
Figure 3C:
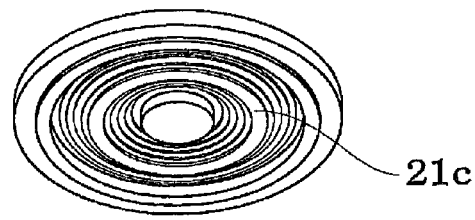
Figure 3D:
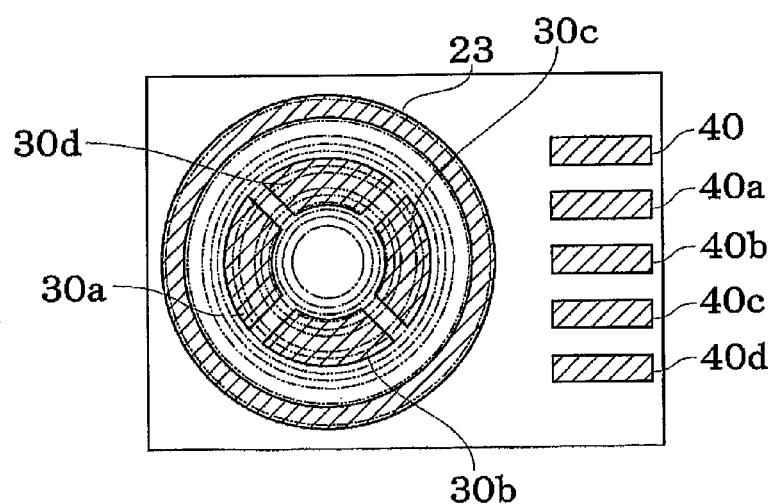
Figure 3E:
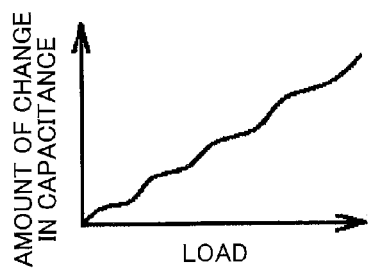

When using the configuration shown in FIGS. 3A to 3D or FIG. 15A, the capacitance change characteristics become approximately linear (see FIG. 3E).

FIGS. 4A to 4D illustrate an example in which a protrusion 21d is formed radially from the center to the outer circumference.

Figure 4A:
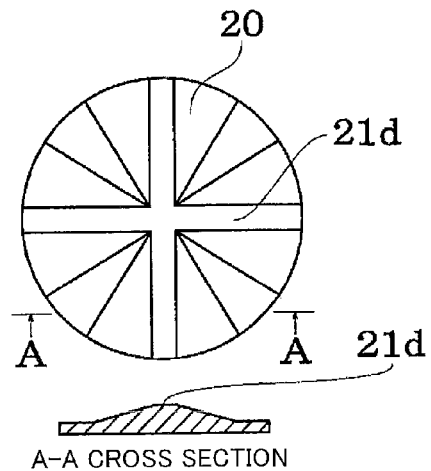
FIGS. 4A to 4D are views illustrating an example in which a protrusion is formed radially.
Figure 4B:
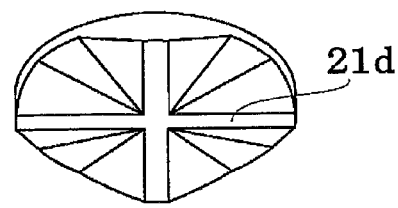
Figure 4C:
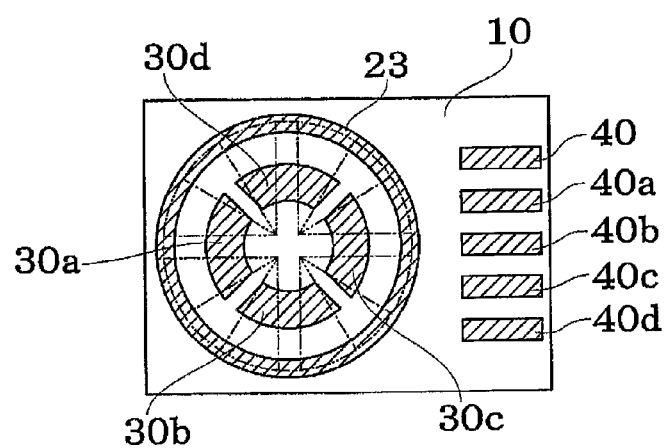
Figure 4D:
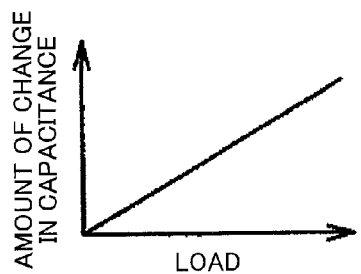
Figure 5A:
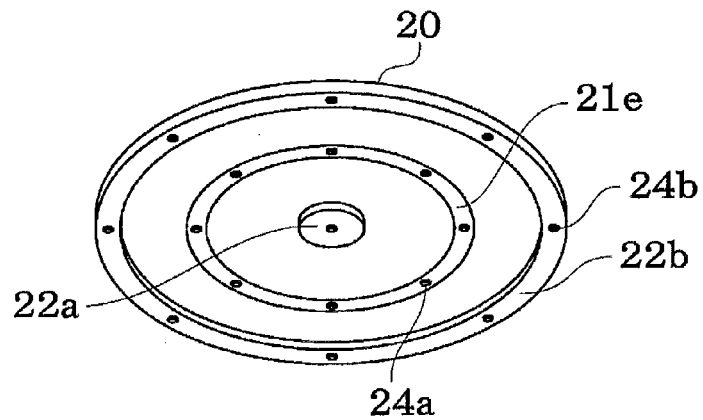
FIGS. 5A to 5D are views illustrating an example in which a depression or a groove that receives an adhesive is formed in the end of a protrusion.
Figure 5B:
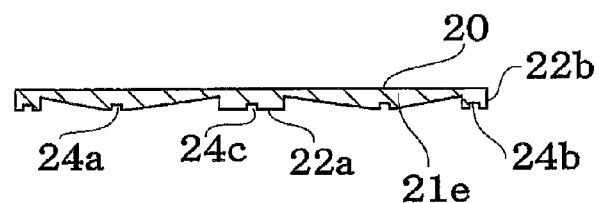
Figure 5C:
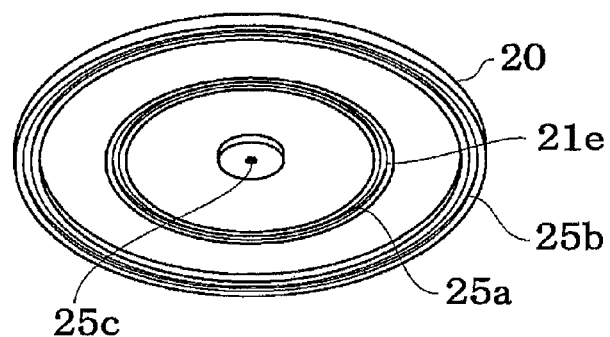
Figure 5D:
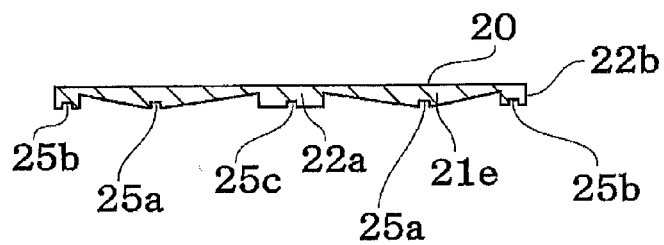
Figure 6A:
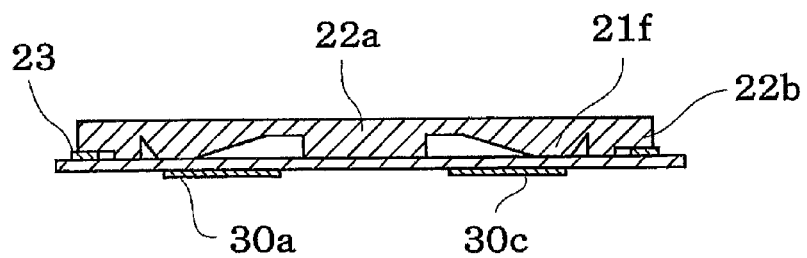
FIGS. 6A to 6D are views illustrating an example in which the outer side surface and the inner side surface of a protrusion differ in tilt angle.
Figure 6B:
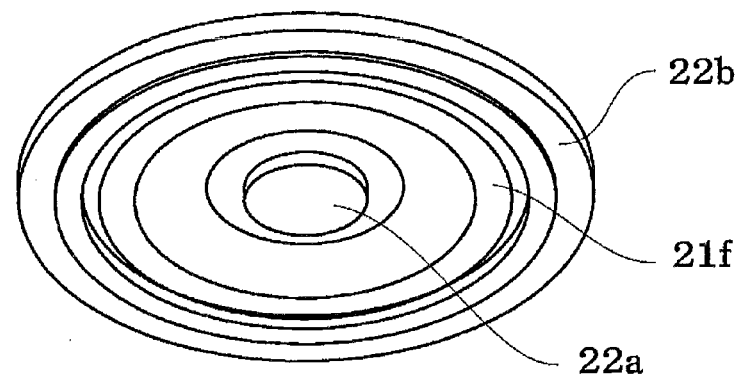
Figure 6C:
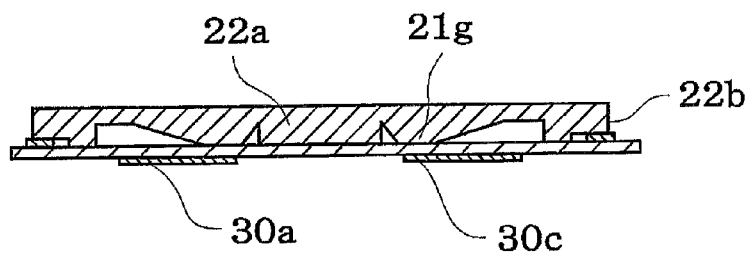
Figure 6D:
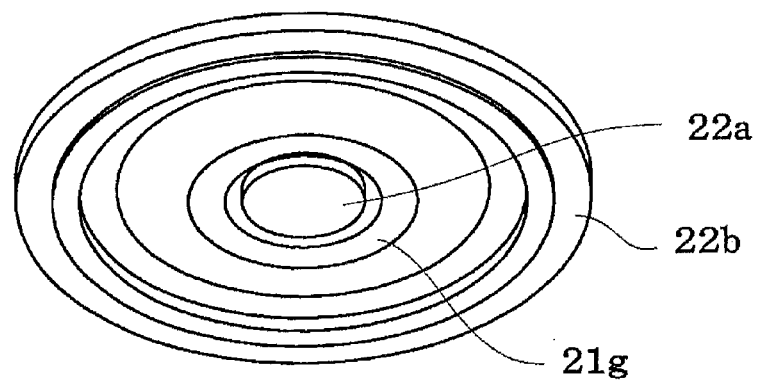

In this case, approximately linear capacitance change characteristics can be easily obtained (see FIG. 4D).

FIGS. 5A to 5D illustrate an example in which depressions 24a, 24b, and 24c (FIGS. 5A and 5B) or grooves 25a, 25b, and 25c (FIGS. 5C and 5D) are provided to receive an adhesive when bonding an end 21e of the protrusion and the immobile sections 22a and 22b of the movable electrode 20 to the upper side of the resin film substrate 10.

FIGS. 6A to 6D illustrate an example in which the movable electrode 20 includes the center immobile section 22a and the peripheral immobile section 22b that are provided concentrically. A ring-shaped protrusion 21f (FIGS. 6A and 6B) or 21g (FIGS. 6C and 6D) is formed between the center immobile section 22a and the peripheral immobile section 22b so as to be concentric with the center immobile section 22a and the peripheral immobile section 22b. In the example shown in FIG. 6A, the tilt angle of a first side surface of the protrusion 21f that is formed from the end of the protrusion 21f toward the center immobile section 22a is less than the tilt angle of a second side surface of the protrusion 21f that is formed from the end of the protrusion 21f toward the peripheral immobile section 22b. In the example shown in FIG. 6C, the tilt angle of a first side surface of the protrusion 21g that is formed from the end of the protrusion 21g toward the center immobile section 22a is more than the tilt angle of a second side surface of the protrusion 21g that is formed from the end of the protrusion 21g toward the peripheral immobile section 22b. The inner side surface and the outer side surface of the protrusion 21f or 21g may differ in tilt angle in this manner.

Figure 7A:
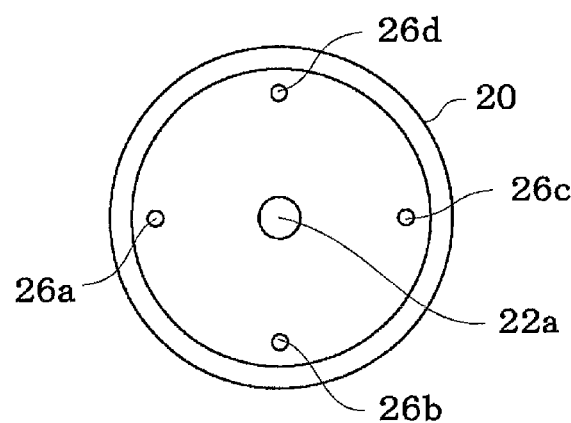
FIGS. 7A and 7B are views illustrating an example in which an immobile section of a movable electrode is formed between capacitance detection electrodes.
Figure 7B:
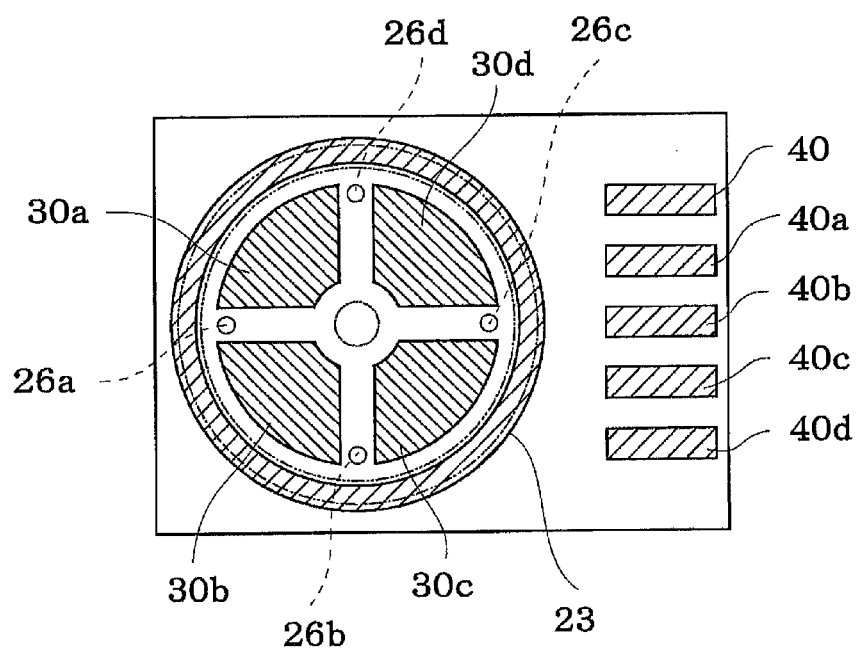
Figure 8A:
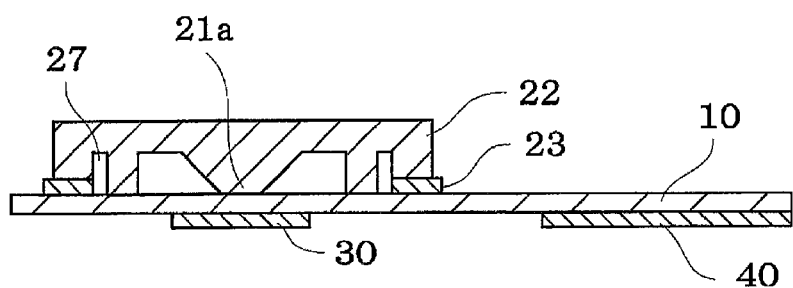
FIGS. 8A to 8D are views illustrating an example in which a groove is formed in an immobile section of a movable electrode.
Figure 8B:
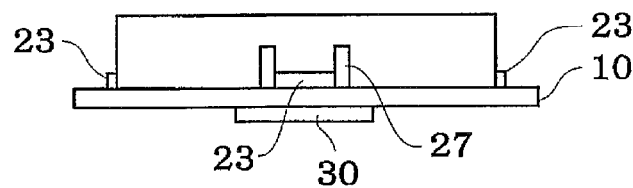
Figure 8C:
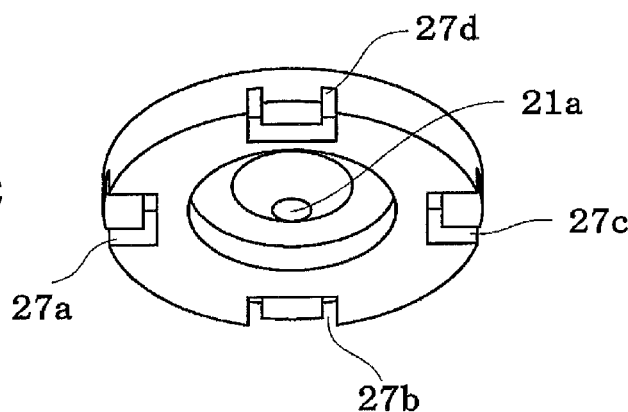
Figure 8D:
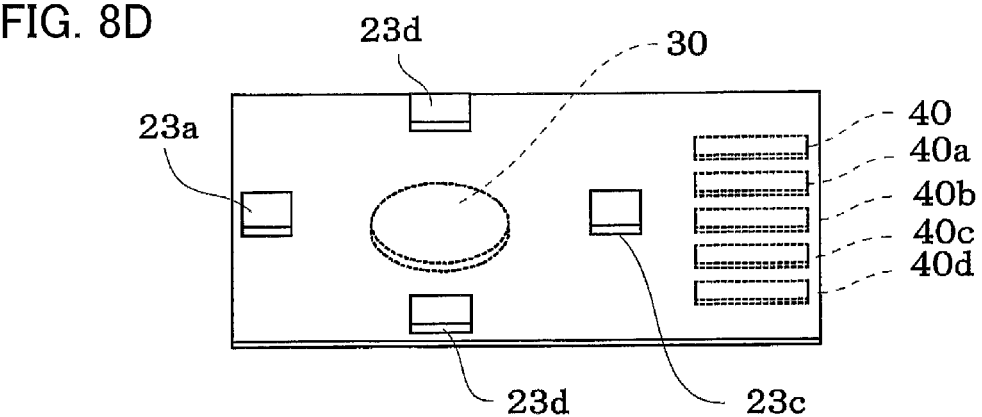

FIGS. 7A and 7B illustrate an example in which immobile sections 26a to 26d of the movable electrode 20 are formed between the capacitance detection electrodes 30a to 30d, and bonded to (secured on) the upper side of the resin film substrate 10.

In this case, the input device can be easily bent without affecting a change in capacitance.

FIGS. 8A to 8D illustrate an example in which grooves 27a to 27d are formed in the immobile section 22 in an area around the connection section 23 for which it is necessary to avoid adhesion of an adhesive when bonding the movable electrode 20 to the upper side of the resin film substrate 10. The grooves 27a to 27d reduce stress applied to the immobile section 22 when bonding the movable electrode 20 to the resin film substrate 10, and prevent a situation in which the capacitance change characteristics are affected.

FIGS. 9A to 9C illustrate an input device in which sensor sections are disposed in a matrix. In FIGS. 9A to 9C, groove-shaped hollow sections 28 are formed in the immobile section 22 at positions between a plurality of moving sections that respectively include the protrusion 21a. In this case, the input device can be easily bent.

FIG. 10 illustrates an example in which the capacitance detection electrode 30 is formed by connecting (combining) a section (i) that is in the shape of an inverted triangle and increases in width (area) as the distance from a section (c) that is opposite to the end of the protrusion 21a (indicated by dot-dash lines) of the movable electrode 20 increases in the horizontal direction, and a section (o) that is in the shape of an inverted triangle and increases in width (area) as the distance from the section (c) increases in the horizontal direction. FIG. 11 illustrates an example in which the number of holes 30e formed in the capacitance detection electrode 30 decreases as the distance from a position opposite to the end of the protrusion 21a increases in the horizontal direction.

Specifically, the capacitance change characteristics may be adjusted by appropriately forming the capacitance detection electrode 30, as shown in FIGS. 10 and 11.

Figure 12:
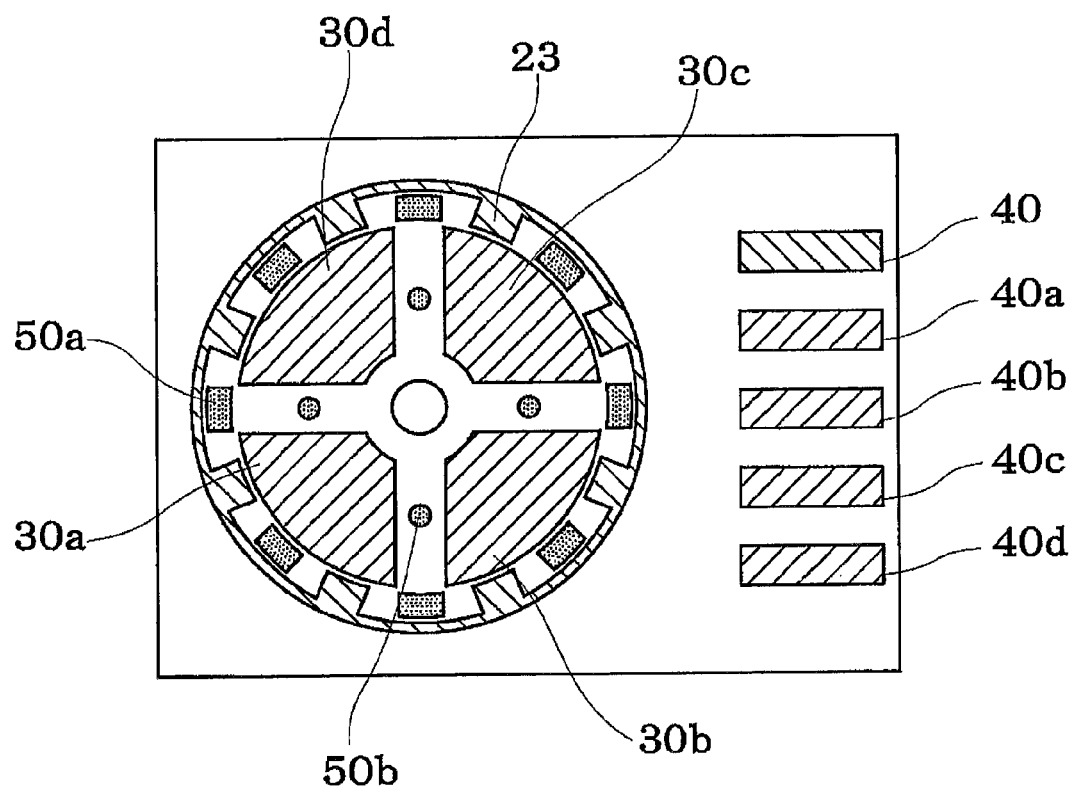
FIG. 12 is a view illustrating an example in which a fixed electrode and a bonding section are disposed so that the bonding section does not overlap the fixed electrode.

FIG. 12 illustrates an example in which bonding sections 50a and 50b of the immobile section 22 of the movable electrode 20 and a fixed electrode pattern (not shown) of the resin film substrate 10 that is connected to the connection section 23 are disposed so that the bonding sections 50a and 50b do not overlap the electrode pattern when viewed vertically.

According to this configuration, when bonding the movable electrode 20 to the upper side of the resin film substrate 10 using a UV-curable adhesive, UV rays can be applied to the UV-curable adhesive through the lower side of the transparent resin film substrate 10 without being blocked by the electrode pattern, so that productivity is improved.

Since the input device according to each embodiment of the invention is formed by combining the resin film substrate and the conductive movable electrode, the input device may be applied to various electronic instruments as a thin input device that exhibits excellent flexibility (bendability).

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. An input device comprising:
   a resin film substrate, a plurality of lead electrodes being formed on the resin film substrate;
   a movable electrode that is provided on an upper side of the resin film substrate, and is formed of a conductive material; and
   at least one capacitance detection electrode that is provided on a lower side of the resin film substrate,
   the movable electrode including at least one moving section that moves when pressed, and at least one immobile section that is bonded to the upper side of the resin film substrate,
   the at least one immobile section being electrically connected to one lead electrode among the plurality of lead electrodes,
   the at least one moving section including a protrusion that protrudes toward the upper side of the resin film substrate,
   an end of the protrusion coming in contact with the upper side of the resin film substrate in an initial state, or being bonded to the upper side of the resin film substrate,
   the at least one capacitance detection electrode being disposed opposite to the at least one moving section, and being electrically connected to at least one other lead electrode among the plurality of lead electrodes, and
   the protrusion having a curved shape so that a side surface of the protrusion is depressed relative to a straight line that connects the end and a base of the protrusion having an approximately trapezoidal cross-sectional shape, or at least one step being formed on the side surface of the protrusion so that a width of the protrusion increases stepwise from the end to the base of the protrusion.

2. The input device as defined in claim 1,
   the end of the protrusion having a projection that does not affect a change in capacitance and is positioned between the end of the protrusion and the at least one capacitance detection electrode, and
   an end of the projection coming in contact with, or being bonded to, the upper side of the resin film substrate.

3. The input device as defined in claim 1,
   the resin film substrate having a connection section that connects the at least one immobile section of the movable electrode and the one lead electrode among the plurality of lead electrodes, and
   the at least one immobile section of the movable electrode having a groove that is formed around the connection section.

4. The input device as defined in claim 1,
   the movable electrode including a plurality of the immobile sections and a plurality of the moving sections, and
   the plurality of immobile sections including a hollow section that enables the resin film substrate to be easily bent.

5. The input device as defined in claim 1,
   the at least one immobile section including a depression or a groove that receives an adhesive used to bond the at least one immobile section to the resin film substrate.

6. The input device as defined in claim 1,
   the at least one capacitance detection electrode being formed in such a number or shape that an area opposite to the at least one moving section increases as a distance from the end of the protrusion of the movable electrode increases.

7. The input device as defined in claim 1,
   an electrode pattern not being formed on the lower side of the resin film substrate in an area opposite to an area of the at least one immobile section of the movable electrode that is bonded to the upper side of the resin film substrate.

8. An input device comprising:
   a resin film substrate, a plurality of lead electrodes being formed on the resin film substrate;
   a movable electrode that is provided on an upper side of the resin film substrate, and is formed of a conductive material; and
   at least one capacitance detection electrode that is provided on a lower side of the resin film substrate,
   the movable electrode including at least one moving section that moves when pressed, and at least one immobile section that is bonded to the upper side of the resin film substrate,
   the at least one immobile section being electrically connected to one lead electrode among the plurality of lead electrodes,
   the at least one moving section including a plurality of protrusions that protrude toward the upper side of the resin film substrate,
   the at least one capacitance detection electrode being disposed opposite to the at least one moving section, and being electrically connected to at least one other lead electrode among the plurality of lead electrodes,
   the plurality of protrusions being formed concentrically,
   an end of an innermost protrusion among the plurality of protrusions coining in contact with the upper side of the resin film substrate in an initial state, or being bonded to the upper side of the resin film substrate, and
   the plurality of protrusions sequentially decreasing in height from the innermost protrusion to an outermost protrusion among the plurality of protrusions.

9. The input device as defined in claim 8,
an end of at least one protrusion among the plurality of protrusions having a projection that does not affect a change in capacitance and is positioned between the end of the at least one protrusion and the at least one capacitance detection electrode, and
an end of the projection coming in contact with, or being bonded to, the upper side of the resin film substrate.

10. The input device as defined in claim 8,
the resin film substrate having a connection section that connects the at least one immobile section of the movable electrode and the one lead electrode among the plurality of lead electrodes, and
the at least one immobile section of the movable electrode having a groove that is formed around the connection section.

11. The input device as defined in claim 8,
the movable electrode including a plurality of the immobile sections and a plurality of the moving sections, and
the plurality of immobile sections including a hollow section that enables the resin film substrate to be easily bent.

12. The input device as defined in claim 8,
the at least one immobile section including a depression or a groove that receives an adhesive used to bond the at least one immobile section to the resin film substrate.

13. The input device as defined in claim 8,
the at least one capacitance detection electrode being formed in such a number or shape that an area opposite to the at least one moving section increases as a distance from an end of at least one protrusion among the plurality of protrusions of the movable electrode increases.

14. An input device comprising:
a resin film substrate, a plurality of lead electrodes being formed on the resin film substrate;
a movable electrode that is provided on an upper side of the resin film substrate, and is formed of a conductive material; and
at least one capacitance detection electrode that is provided on a lower side of the resin film substrate,
the movable electrode including at least one moving section that moves when pressed, and at least one immobile section that is bonded to the upper side of the resin film substrate,
the at least one immobile section being electrically connected to one lead electrode among the plurality of lead electrodes,
the at least one moving section including a protrusion that protrudes toward the upper side of the resin film substrate,
an end of the protrusion coming in contact with the upper side of the resin film substrate in an initial state, or being bonded to the upper side of the resin film substrate,
the at least one capacitance detection electrode being disposed opposite to the at least one moving section, and being electrically connected to at least one other lead electrode among the plurality of lead electrodes,
the movable electrode including a center immobile section and a peripheral immobile section that are provided concentrically,
the protrusion of the at least one moving section being formed between the center immobile section and the peripheral immobile section so as to be concentric with the center immobile section and the peripheral immobile section, and
a tilt angle of a first side surface of the protrusion that is formed from the end of the protrusion toward the center immobile section differing from a tilt angle of a second side surface of the protrusion that is formed from the end of the protrusion toward the peripheral immobile section.

15. The input device as defined in claim 14,
the protrusion having a projection that does not affect a change in capacitance and is positioned between the end of the at least one protrusion and the at least one capacitance detection electrode, and
an end of the projection coming in contact with, or being bonded to, the upper side of the resin film substrate.

16. The input device as defined in claim 14,
the resin film substrate having a connection section that connects the at least one immobile section of the movable electrode and the one lead electrode among the plurality of lead electrodes, and
the at least one immobile section of the movable electrode having a groove that is formed around the connection section.

17. The input device as defined in claim 14,
the movable electrode including a plurality of the immobile sections and a plurality of the moving sections, and
the plurality of immobile sections including a hollow section that enables the resin film substrate to be easily bent.

18. The input device as defined in claim 14,
the at least one immobile section including a depression or a groove that receives an adhesive used to bond the at least one immobile section to the resin film substrate.

19. The input device as defined in claim 14,
the at least one capacitance detection electrode being formed in such a number or shape that an area opposite to the at least one moving section increases as a distance from the end of the protrusion of the movable electrode increases.

* * * * *